US006822552B2

(12) United States Patent
Lidën et al.

(10) Patent No.: US 6,822,552 B2
(45) Date of Patent: Nov. 23, 2004

(54) KEY AND LOCK DEVICE

(75) Inventors: Inge Lidën, Eskilstuna (SE); Rolf Norberg, Täby (SE); Björn Magnusson, Tumba (SE); Hannu Sivonen, Marjovaara (FI); Gudrun Brennecke, Berlin (DE); Christophe Chanel, Berlin (DE); Jürgen Krühn, Berlin (DE); Bernd Kikebusch, Berlin (DE); Arnaud Lefebvre, Troyes (FR)

(73) Assignee: Assa Abloy AB, Stockholm (SE)

( * ) Notice: Subject to any disclaimer, the term of this patent is extended or adjusted under 35 U.S.C. 154(b) by 404 days.

(21) Appl. No.: 09/802,934

(22) Filed: Mar. 12, 2001

(65) Prior Publication Data

US 2001/0028298 A1 Oct. 11, 2001

(30) Foreign Application Priority Data

Mar. 10, 2000 (SE) .......................................... 0000794-8

(51) Int. Cl.[7] .......................... G05B 19/00; G05B 23/00

(52) U.S. Cl. .................... 340/5.21; 340/5.52; 340/5.53; 340/5.61; 340/5.64; 340/10.1; 380/282; 380/230

(58) Field of Search ............................... 340/5.21, 5.52, 340/5.53, 5.61, 5.64, 10.1, 10.5; 70/271, 277; 380/282, 230, 281, 29; 280/284, 281; 713/168, 185

(56) References Cited

U.S. PATENT DOCUMENTS

| | | | | |
|---|---|---|---|---|
| 4,209,782 A | | 6/1980 | Donath et al. | |
| 4,558,175 A | | 12/1985 | Genest et al. | |
| 4,736,419 A | | 4/1988 | Roe | |
| 4,887,292 A | | 12/1989 | Barrett et al. | |
| 4,912,310 A | | 3/1990 | Uemura et al. | |
| 5,144,667 A | | 9/1992 | Pogue, Jr. et al. | |
| 5,347,267 A | | 9/1994 | Murray | |
| 5,749,253 A | | 5/1998 | Glick et al. | |
| 5,774,550 A | | 6/1998 | Brinkmeyer et al. | |
| 6,005,487 A | | 12/1999 | Hyatt, Jr. et al. | |
| 6,530,020 B1 | * | 3/2003 | Aoki | 713/163 |
| 6,678,821 B1 | * | 1/2004 | Waugh et al. | 713/168 |

FOREIGN PATENT DOCUMENTS

| | | |
|---|---|---|
| DE | 196 00 556 | 7/1997 |
| EP | 0 410 024 | 1/1991 |
| WO | 90/15211 | 12/1990 |
| WO | WO 96/23122 | 8/1996 |

* cited by examiner

*Primary Examiner*—Michael Horabik
*Assistant Examiner*—Vernal Brown
(74) *Attorney, Agent, or Firm*—Sughrue Mion, PLLC

(57) ABSTRACT

A key and lock device comprises a key and a standalone lock. The key has an electronic circuitry with a first memory and a contact. The lock has electronic circuitry with a memory, and a contact arranged to co-operate with the key's first contact. A blocking mechanism is adapted to block operation of the lock unless an authorized key is inserted in the lock. The memory of the key stores a public identification item of the key identifying a group of keys having identical mechanical codes. In the memory of the lock, there is provided a list of the public and secret identification items of authorized keys and a list of the public identification item of non-authorized keys. A key is authorized if the public and secret identification items are present in the list of authorized keys and the public identification item thereof is absent in the list of non-authorized keys.

21 Claims, 3 Drawing Sheets

KEY AND LOCK DEVICE

FIELD OF INVENTION

The present invention relates generally to key and lock devices, and more specifically to electromechanical key and lock devices and lock systems comprising such devices.

BACKGROUND

It is previously known a variety of lock devices that use electronic devices for increasing the security of the lock and for providing effective administration, management, and control of keys and personnel. However, these devices have had the inherent drawback of either being wired with accompanying high installation costs or stand alone devices requiring significant individual efforts to change or extend the system with keys and/or locks.

Another drawback of prior art lock systems is that they are difficult to create and adapt to the specific requirements of a customer.

The US patent document U.S. Pat. No. 4,887,292 (Barrett et al.) discloses an electronic lock system provided with a "lockout list" that identifies keys that are to be prevented from opening system locks. This system is adapted to be used with real estate lockboxes used in the real estate industry to contain the keys of houses listed for sale. The inflexibility of the disclosed system results in it not addressing the above mentioned problems of prior art key and lock systems.

SUMMARY OF THE INVENTION

An object of the present invention is to provide for easy adding or deleting of authorization of access to the operation of a lock by the key.

Another object is to provide an electromechanical key and lock device of the kind initially mentioned wherein the distribution and assignment of keys are more secure than in known lock systems.

Another object is to provide a lock system with a high level of key control and wherein no keys can be added without the knowledge of the system owner.

Another object is to provide a lock system with a high level of authorization control.

Another object is to provide a lock system that is easy to create and service.

Yet another object is to provide a key and lock device wherein the assignment of keys is facilitated.

The invention is based on the realization that certain information elements or items of an electronic key code will provide for a simple and yet secure distribution and assignment of keys in a master key system.

According to the invention, there is also provided a method of updating authorization information of a lock device of a lock system.

A key and lock device and a lock system according to the invention addresses the above mentioned problems and drawbacks of prior art devices. By providing a group concept together with lists indicating authorized and non-authorized devices easy adding and deleting of keys and locks is made possible while a high level of security is maintained. In a non-wired system, the group concept makes it possible to add new keys to the system without having to access or alter existing locks.

BRIEF DESCRIPTION OF DRAWINGS

The invention is now described, by way of example, with reference to the accompanying drawings, in which.

DETAILED DESCRIPTION OF THE INVENTION

In the following, a detailed description of preferred embodiments of the invention will be described.

Lock System and Tools

Figure 1:
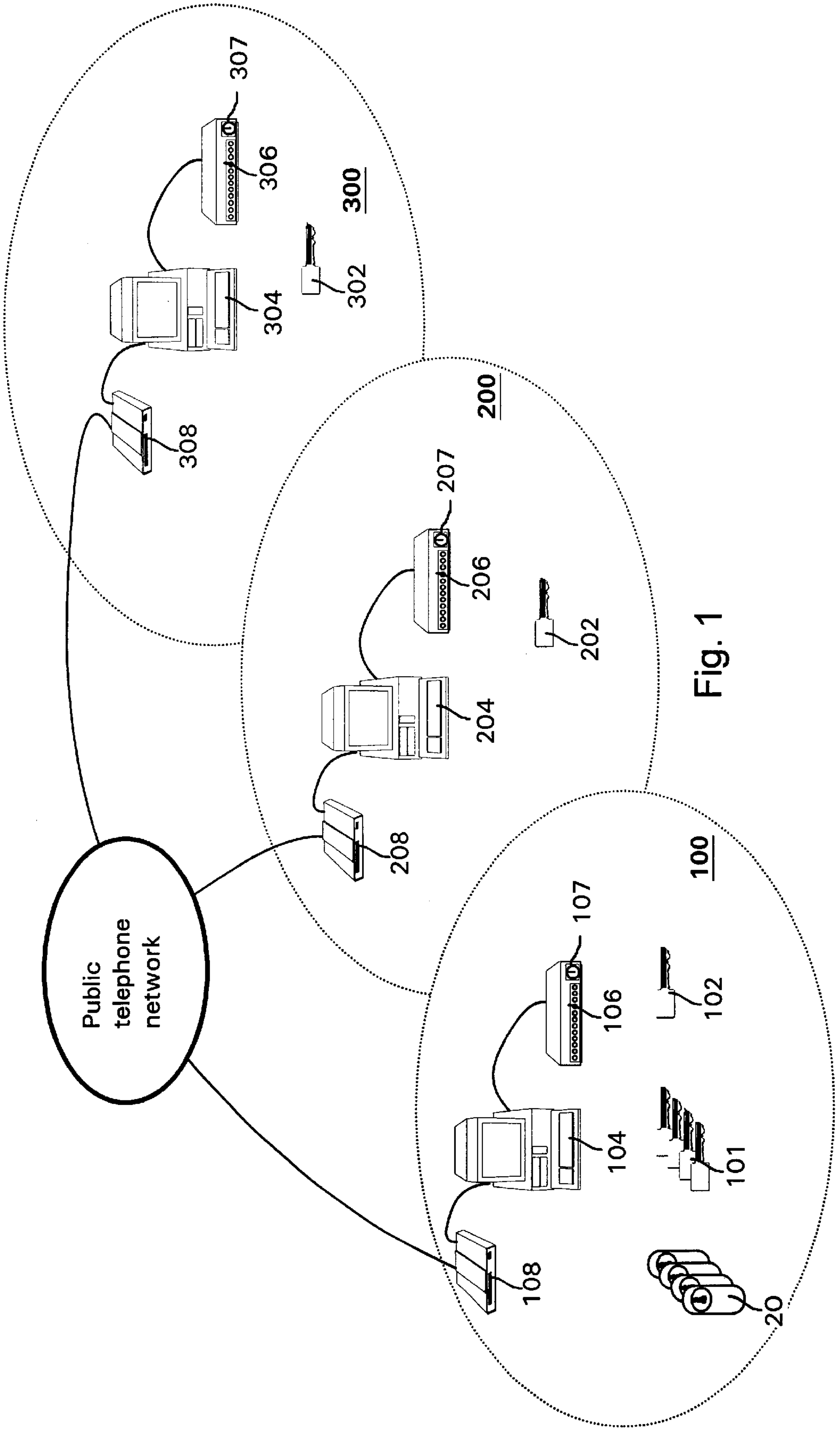
FIG. 1 is an overall view of a lock system according to the invention.

A lock system comprising lock devices according to the invention will now be described with reference to FIG. 1, which shows the distribution of hardware and software tools among different hierarchical levels of a lock system, namely customer 100, distributor 200 and manufacturer 300. The manufacturer, distributors and customers constitute the members of the overall lock system.

Each element, i.e., key, lock etc., in the system belongs to one and only one master key system. This is to maintain the high security levels required of today's lock systems.

Software

At each level there is software installed. There are three different kinds of software, one for each of the three levels: Manufacturer software (M-software), Distributor software (D-software) and Customer software (C-software).

Each installed software maintains a database comprising information, such as encryption keys etc. In case the communication encryption keys must be changed, the manufacturer sends the new keys encrypted with the current communication encryption key.

User Keys

In the customer system 100, there are several user keys 101 adapted for use with a number of locks 20.

Programming and Authorization Key

There is at least one special programming and authorization key (C-key) 102 for a customer system. A C-key can be a normal looking key, but with special features. It includes, like a normal user key, a simple user interface, either a small display or a buzzer.

There is a defined routine and sequence to replace a lost C-key. This routine leads back to the factory for authorization.

Customer Programming Box

At the customer, there is a programming box 106 adapted for connection to a computer (PC) 104 via e.g. a serial interface. This programming box comprises a static reader 107 and is used for programming keys and locks in the customer system. A static reader is a key reader without a blocking mechanism and thus comprises electronic circuits etc. for reading and programming a key.

Optionally, the programming box can be provided with an internal power source, thus also functioning as a stand alone box operating disconnected from the computer 104.

Although a customer programming box is shown in the figure, this box can be omitted in very small lock systems.

Customer Software

The customer has access to a personal computer 104 running customer administration software (C-software) with open system information only. Thus, the C-software keeps track of which keys are authorized in which locks in the lock system in question. It also contains information regarding secret identities of all keys of a system.

Authorization Key for the Distributor

There is an authorization key (D-key) 202 for the distributor of the lock system, who can be e.g. a locksmith. The function of this key is equivalent of the C-key. However, a D-key has special authorization data for the particular software with which it will be used. A D-key is also used as a secure communication bridge for all distributor level programming.

Distributor Programming Box

At the distributor, there is a programming box 206 adapted for connection to a computer (PC) 204 via e.g. a serial interface, like a RS232C interface. This programming box can be identical to the one described in connection with the customer system 100.

Distributor Software

The distributor has special computer software (D-software) for a personal computer 204. The D-software includes an open part for display of open system information and for design of changes etc. It also includes a secret part including authorization codes and secret keywords used in the system. The D-software also supports encrypted communication to manufacturer lock system computer 304 through e.g. a modem connection 208.

The D-software stores secret identities of keys, but not in plain text but in an encrypted format. However, the encryption keys are not stored with the D-software but is present in the D-key. Thus, the D-key is needed when the encrypted information is to be read.

The distributor software may use as a module a key/lock register, which constitutes the customer system. In that way, the distributor can work transparently as if the distributor and customer software were one system. This is necessary for the distributor if he is going to be closely involved with servicing the customer system.

Manufacturer Key

There is an authorization key (M-key) 302 with a function similar to the D-key, but with authorization to M-software including all master key systems delivered by the manufacturer in question.

Manufacturer Programming Box

This is a programming box 306 similar to the distributor programming box.

Manufacturer Software

The manufacturer has access to a personal computer 304 running software (M-software) with full authorization for all operations.

The tools used create a flexible environment, which can be configured in a way to fit the market conditions. Authorization can be limited or extended at the different levels. However, the manufacturer can always do everything that can be done. The distributor can never store secret codes himself and the customer can normally not create a new or extended system himself. The manufacturer can hereby control the level of authorization for the distributor and the distributor can control the system maintenance.

The above mentioned tools together determine the possible operations of the different parts. In practice, the system can operate in many different structures and set-ups. It all depends on to whom the different tools are distributed. This provides a flexible system, which can be adapted for a wide range of applications.

Key and Lock Electronics

Figure 2:
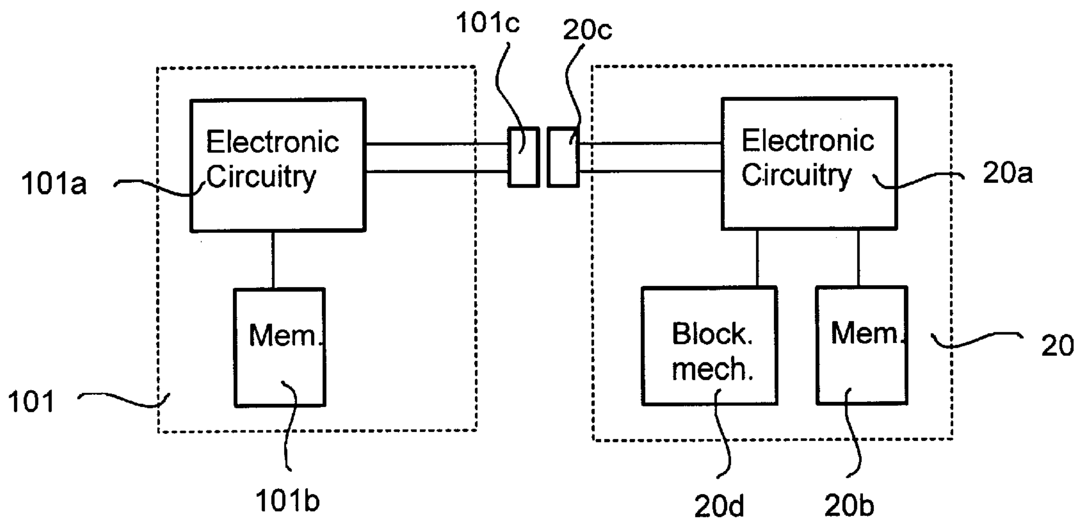
FIG. 2 is a block diagram of a key and lock device according to the invention.

In the following, a description of the key and lock electronics will be given with reference to FIG. 2, which is a schematic block diagram of a key and a lock.

The key, generally designated 101 comprises electronic circuitry 101*a* having a microprocessor, timer circuits etc. for executing the normal operations of a microprocessor arrangement. Specifically, a memory circuit 101*b* has been shown electrically connected to the electronic circuitry. This memory circuit is used for storing information regarding the key, as will be explained below.

A contact 101*c* placed on the exterior of the key 101 is also shown electrically connected to the circuitry 101*a*.

The lock, generally designated 20, comprises an electronic circuitry 20*a* having a microprocessor, timer circuits etc. for executing the normal operations of a microprocessor arrangement. This circuitry 20*a* is similar to the one 101*a* located in the key. This is an advantage in that large-scale production reduces manufacturing costs.

A memory circuit 20*b* is shown electrically connected to the electronic circuitry 20*a*. This memory circuit is used for storing information regarding the lock and authorized keys, as will be explained below.

A contact 20*c* is located in the lock 20 and is shown electrically connected to the circuitry 20*a*. This lock contact is arranged to co-operate with the key contact 101*a* in order to establish electric connection between the key electronics and the lock electronics.

There is also an electrically controlled blocking mechanism 20*d* in the lock 20. This mechanism is controlled by means of driving circuitry (not shown) and opens the lock as a result of identification of an authorized key in the lock.

Group Concept

The customer level 100 of the master key system described with reference to FIG. 1 can be divided into different groups and each user key 101 belongs to one and only one group. However, the groups can be defined according to several different rules, which will be described in the following.

Standard Solution

The standard solution is to have one key cut per individual door and one group per mechanical key cut. This solution is used in prior art lock systems and thus does not require any modification of the thinking of developing a new MKS. This gives a very secure but somewhat inflexible solution.

Organizational Solution

Figure 3:
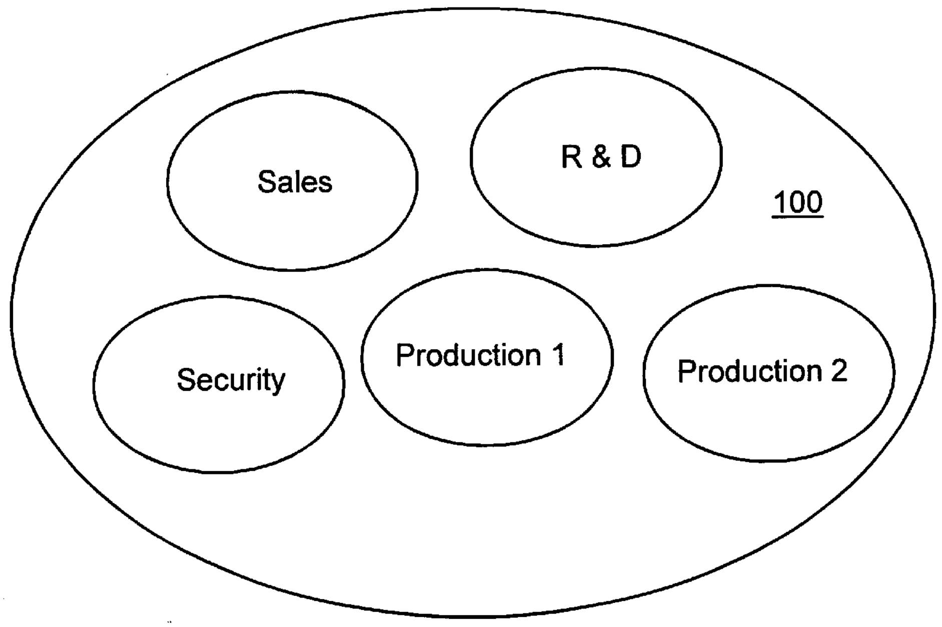
FIG. 3 is a diagram showing the group concept used with the invention.

According to the organizational solution, one mechanical key-cut and one group is assigned to each “department” of the organization using the MKS. Thus, in a typical company, the sales department, research and development department, security guards, production department 1, production department 2 etc. are each assigned to a specific group. This is illustrated in FIG. 3 showing the customer level of a MKS according to the invention.

The advantage of this solution is that less different mechanical key-cuts are required and that it gives flexibility in the set-up of the system.

One Key-Cut, Many Groups

According to this solution, few key-cuts are made. As an example, all individual user keys of one floor, several floors or even the entire company have the same key-cut. Further, all master keys have the same key-cut, sub-master keys level 1 have another, level 2 yet another etc.

Groups are then defined as in the organizational solution described with reference to FIG. 3.

This solution gives very few mechanical key-cuts, resulting is a very flexible master key system.

The described solutions may of course be varied depending on the special requirements of the system. As an example, some departments may be divided into several groups. Alternatively, several small departments may constitute one group. The way the group concept is used can also vary within an organization. However, an important feature is that all keys in one group are mechanically identical, i.e., with identical key-cuts. The reason therefor will be described below.

Information Elements

Figure 4A:
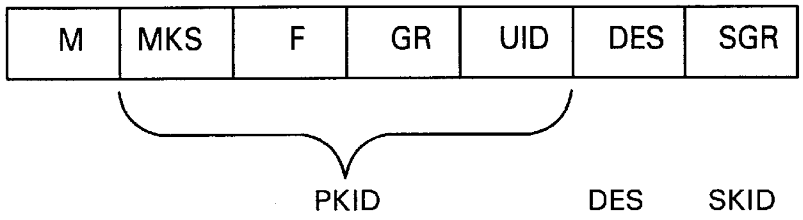
FIGS. 4*a* and 4*b* are diagrams showing information elements in a key and a lock, respectively, according to the invention.
Figure 4B:
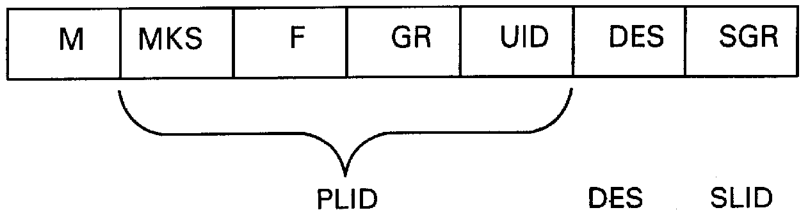

All keys and locks have a unique electronic identity or code comprising several information elements controlling the functions of the keys and locks. The information elements of a key or a lock will now be described with reference to FIGS. 4a and 4b, respectively.

The code is divided into different segments for the use of manufacturers, distributors, customers and individual key data's while a secret segment is provided for secret information and is always individual for the group.

All keys and locks have a unique electronic code or identity. Every lock code comprises the following parts:

- Manufacturer identification (M)
- Public Lock ID (PLID) comprising
  - Master Key System identification (MKS)
  - Function identification (F)
  - Group ID (GR)
  - Unique Identity (UID)
- DES key
- Secret Lock ID (SLID) comprising
  - Secret group ID (SGR)

Correspondingly, every key code comprises the following parts:

- Manufacturer identification (M)
- Public Key ID (PKID) comprising
  - Master Key System identification (MKS)
  - Function identification (F)
  - Group ID (GR)
  - Unique Identity (UID)
- DES key
- Secret Key ID (SKID) comprising
  - Secret group ID (SGR)

The basic elements will now be described in more detail.

M—Manufacturer

M identifies the manufacturer of the master key system. In the description and examples of the invention given below, this element is omitted as all keys and locks are assumed to have the same manufacturer.

MKS—Master Key System

MKS identifies the different Master Key Systems. A lock will accept a user key or a C-key only if they have the same MKS code. In the description and examples of the invention given below, this element is omitted as all keys and locks are assumed to belong to the same master key system.

F—Function

F identifies the role of the device; whether it is a lock, a user key, a C-key, D-key or M-key.

GR—GRoup

GR is an integer identifying the group. GR is unique in each MKS and starts at 1 with an increment of 1.

UID—Unique Identity

UID identifies the different users in a group. UID is unique in each GR, starts at 1 with an increment of 1.

DES

The DES comprises a randomly generated DES encryption key, the same in one MKS. The DES is in no way readable from the outside and is only used by the algorithms executed internally of the key and lock devices.

SGR—Secret GRoup

SGR is a randomly generated number that is the same for one GR.

Authorization Table

In every lock there is an authorization table stored in electronic memory. The authorization table determines which keys the lock in question accepts. The configuration and function will now be discussed.

The authorization table is divided into two parts, a list of authorized keys (the A-list) and a list of non-authorized keys (the NA-list). A key is authorized only if it is listed in the A-list but not in the NA-list. The A-list comprises both the PKID and the SKID of authorized keys. However, the NA-list comprises only the PKID and not the SKID of non-authorized keys.

A key is listed by its group or its unique identity. In both cases, it is determined by the PKID, comprising the information elements GR-UID, see FIG. 4a. To specify the unique identity, the values of both GR and UID are provided. However, in the case a group is to be specified, UID is given the value "0", denoting no specific key, because the UID for individual keys can take the values "1", "2", "3" etc. As an example, a PKID of 2-0, i.e., GR=2 and UID=0, denotes the entire group 2 of the master key system in question.

It is thus possible to authorize all keys of one group in one lock by memorizing UID=0 for the GR in question. With this solution, all keys of a group, whatever their UID, will be authorized to open the lock, provided they are not listed in the NA-list. This allows the making of a new key, with a new UID, working directly in the lock without one having to reprogram the lock.

As already stated, when a key is listed in the A-list, the secret key identity SKID is stored, too. The SKID is the same for all keys of one group and is used for security reasons. It is not possible to read the SKID from the keys or locks without having fulfilled special authentication procedures by means of a C-key, which will be discussed below.

If an entire group is authorized in the manner described above, it is possible to restrict the access of one or more keys of that group by including their PKID in the NA-list of the lock.

Figure 5:
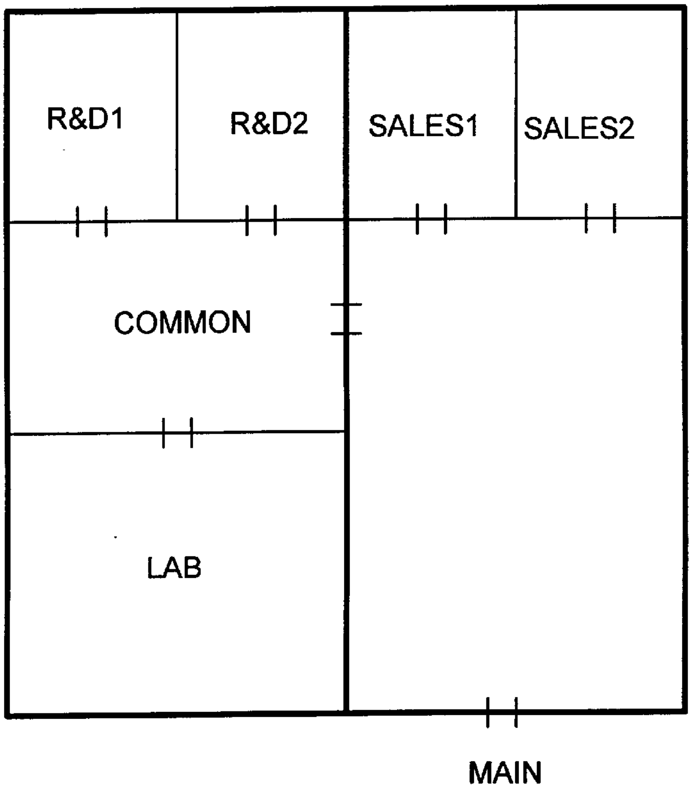
FIG. 5 is a diagram showing an example of distribution of locks in an office building.

An example of organizational grouping and authorization will now be given with reference to FIG. 5, wherein an office building including an R&D department and a sales department is schematically shown. The entire office belongs to master key system 1, i.e., MKS–1 for all keys and locks. There are all in all seven doors in the office, three belonging to the R&D department: R&D1, R&D2, and LAB, two belonging to the sales department: SALES1 and SALES2, and two common doors, MAIN and COMMON. There are four people working in the office, two in the R&D department, Researchers 1 and 2, and two in the sales department, Salespersons 1 and 2.

The master key system is divided into two electronically coded groups, GR=1 (R&D) and GR=2 (Sales), each group with two keys. The PKID of the keys are given in table 1 below:

TABLE 1a

| Group | User | PKID (GR-UID) |
|---|---|---|
| 1 | Researcher 1 | 1-1 |
| 1 | Researcher 2 | 1-2 |
| 2 | Salesperson 1 | 2-1 |
| 2 | Salesperson 2 | 2-2 |

The authorization tables of the different doors are given in table 2

TABLE 2a

| MAIN | | R&D1 | | R&D2 | | LAB | | COMMON | | SALES1 | | SALES2 | |
|---|---|---|---|---|---|---|---|---|---|---|---|---|---|
| A | NA | A | NA | A | NA | A | NA | A | NA | A | NA | A | NA |
| 1-0 | | 1-1 | | 1-2 | | 1-0 | | 1-0 | | 2-1 | | 2-2 | |
| 2-0 | | | | | | | | 2-0 | | | | | |

In common doors, entire groups are listed in the A-list and in private doors, only the specific keys admitted are listed in the A-list.

With this configuration, all four employees are admitted through the main door and to the common room. Only the researchers are admitted to the lab. To the four personal rooms, only the person working therein is admitted.

If one of the employees quits and is replaced by another, new keys must be issued and locks must be reprogrammed. Assume that Researcher 1 quits without returning his keys and is replaced by Researcher 3. The identities of the issued keys will now look like in table 1b:

TABLE 1b

| Group | User | PKID (GR-UID) |
|---|---|---|
| 1 | Researcher 1 | 1-1 |
| 1 | Researcher 2 | 1-2 |
| 1 | Researcher 3 | 1-3 |
| 2 | Salesperson 1 | 2-1 |
| 2 | Salesperson 2 | 2-2 |

Access to the office must be denied to Researcher 1 and instead given to Researcher 3. The PKID of the key of Researcher 1 is therefore added to the NA-list of all locks where Researcher 1 was authorized. The PKID of the key of Researcher 3 must be added to his private room. The authorization tables will then look like in table 2b:

Add Key
Add C-key
Replace Master C-key.
Delete Key
Delete C-key
Authorize Key
Forbid Key
Read Audit Trail
Read Key List
Test
Read User Register
Update User Register Control commands for programming device Scan Programming Audit Trail
Scan Test results
Scan Key list from a lock
Scan Audit trail list from a lock
Identification of the lock
Delete Task
Delete Key List
Delete Audit Trail
Delete Programming Audit trail
Delete all Status data:

Task activated in a C-key
Task done for a lock
Etc.

TABLE 2b

| MAIN | | R&D1 | | R&D2 | | LAB | | COMMON | | SALES1 | | SALES2 | |
|---|---|---|---|---|---|---|---|---|---|---|---|---|---|
| A | NA | A | NA | A | NA | A | NA | A | NA | A | NA | A | NA |
| 1-0 | 1-1 | 1-1 | 1-1 | 1-2 | | 1-0 | 1-1 | 1-0 | 1-1 | 2-1 | | 2-2 | |
| 2-0 | | 1-3 | | | | | | 2-0 | | | | | |

Additions compared to table 2a are indicated by boldface.

It is thus very easy to make the necessary changes to the locks of the master key system.

It is appreciated that if there are identical entries in the A and the NA lists, both could be deleted to save memory.

The electronic coding can be supplemented by mechanical coding as well. In the present example, there can only be two mechanical cuttings, MC1 and MC2, as there are only two electronically coded groups and the mechanical coding must be the same within a group.

Defined Operations

In the following, an overview of the different operations in the system will be given. Initially, the original master key system is created and programmed by the manufacturer by means of the manufacturer software 304. This initial system includes one or more C-keys 102. Complete information on the created system is stored in the M-software 304.

There are a number of defined operations with their separate rules. The possible operations are listed in the following:

Some of these operations will now be discussed in detail.

Add Key Operation

A key is added to the number of authorized keys by adding its PKID and SKID to the A-list.

Delete Key Operation

To delete authorization of a key, the PKID and the SKID of the key are deleted from the A-list. This is called the delete operation. From now on, the key is not authorized and to make it authorized, the add operation must once again be performed.

Forbid Key Operation

As already stated, when a key or a group is authorized in a lock, its SKID is also memorized in the A-list of the lock. It is possible to instruct a lock to copy the PKID to the NA-list and to leave the PKID and SKID in the A-list. In this case, the lock will not open to the key in question because a lock does not open to a key in the NA-list, even if it is in the A-list. This operation to copy the PKID to the A-list is called a forbid operation.

Reauthorize Key Operation

If a forbid operation has been performed on a key, it is possible to reauthorize the key without having its SKID, i.e., without access to the key itself. The only thing you have to do is to delete the PKID in the NA-list. This operation is called a reauthorization operation.

The combination of the forbid and reauthorize operations is useful when a key is to be reauthorize without having access to the key. It means that the PKID and the SKID of a key has to be entered in the A-list only once. Thereafter, forbid or reauthorization operations are performed.

Replace Key Operation

The replace operation enables manufacturing of a key that will tell all locks in which the key has been inserted that it is replacing a specific key. This operation can only be performed in locks in which the replaced key was authorized. The operation checks that the previous key is in the A-list and not in the NA-list. It then puts the PKID of the replaced key on the NA-list.

With this operation, reprogramming is effected automatically. This is particularly useful when a key has been lost.

Create Installer Key Operation

In the initial stages of the creation of a lock system, there is a need for a so-called "Installer Key". This is just a normal user key with authorization in all locks of the system and which is used during installation. It must be excluded after use like any "lost" key.

C-Keys

A C-key belongs to a master key system, but has a special code informing that it is a C-key. It also has a PKID but can not operate locks as a user key. There is always a master C-key with a special GR code. This is the first C-key.

For security reasons, C-keys are used for adding and deleting items in the A-list or the NA-list of a lock. In each lock, the identities of all C-keys that are allowed to make changes in the authorization tables are recorded in the A-list. Thereby, it is possible to modify rights to different C-keys in different locks. However, C-keys do not contain any information on the user keys.

The Master C-key is used for changing the authorizations of C-keys. The Master C-key is recorded in all locks of a master key system. The Master C-key is also allowed to make changes of the user key authorizations.

The C-keys are also used to guarantee the security of data stored in the C-software. In combination with a PIN code entered by a user, a C-key enables reading of encrypted data in the C-software.

If a C-key is lost, authorizations can be changed by means of the Master C-key. If the Master C-key is lost, the manufacturer delivers a new Master C-key. By means of this new Master C-key and the replace operation, the lost Master C-key can be replaced in all locks in the master key system and the C-software.

Use of C-Keys

A C-key can be used in different ways for programming locks in a master key system. In the following, the different ways of programming locks will be described, partly with reference to FIG. 1.

Operations with C-Software

The C-Software of a lock system keeps track of the locks, keys, and their authorizations. If a modification is wanted, it is done in the C-Software of the customer computer 104 and is then downloaded to the C-key by means of the programming box 106 connected to the computer. The procedure at the lock is then as follows: The C-key is then inserted into a lock 20 where modifications are wanted during a specified time interval and the new information is transferred from the C-key to the lock 20.

Thus, when using the C-software, the information items regarding the updated user key authorizations are supplied from the C-software, stored in the C-key and supplied to the lock.

When an operation has been executed correctly for a specific lock, this is written to the C-key. It is then possible to update the status of the system in the C-Software database describing the system. In that way, the current status of the master keys system is always stored in the C-Software.

Operations with a Programming Device

If the C-Software is unavailable, it is possible to change the authorization table of a lock by using a C-key and a programming device. This programming device can be the above-described box 106 operating disconnected from the computer 104. Alternatively, it is a dedicated portable box not shown in the figures and provided with a display and a keypad.

As an alternative, a low cost programming device can sometimes be used instead of the usual programming box. With this low cost alternative, only the delete, forbid and reauthorize operations are possible to perform.

To perform the add operation, an authorized C-key, a programming device and the key are needed. The key is needed because the SKID is needed in the A-list. The C-key can be either a separate key inserted into the box or integrated into the box. An add operation is then selected from a menu and this information is transferred to the lock.

It is also possible to perform other operations in a similar way, such as to authorize an entire group with such a solution by having one key of this group because all keys in a group have the same SKID.

To perform a delete operation, an authorized C-key and a programming device are needed. By means of the programming device, the PKIDs of keys in the A- and NA-lists are scrolled the key to be deleted selected. The key to be deleted is not required because it is possible to put the PKID of an authorized user key in the NA-list and to delete its PKID and SKID from the A-list, even without the user key present.

Thus, when using a programming device, the information items regarding the updated user key authorizations are supplied from the user key and directly to the lock.

Operations Without a Programming Device

With just a C-key and a user key, it is possible change the authorization of the user key in a lock. The C-key is first inserted into the lock for a specified time. The user key is then inserted into the lock. The C-key is then again inserted into the lock to confirm the update. Depending on the operation wanted, the C-key is inserted for different time intervals.

It is possible to delete all keys from the A-list. It is not possible to delete one single lost key from the A-list without deleting all keys in the list. However, it is possible to delete a key from the A-list if the key is present together with an authorized and programmed C-key.

The replace operation is possible to perform without a programming box. Thus, with a new key, a lost key can be replaced by means of the replace operation.

Like when using a programming device, the information items regarding the updated user key authorizations are supplied from the user key and directly to the lock.

Other Operations Possible with a C-Key

It is possible to give a C-key some functions to execute when it is used with locks. It is possible to give a C-key the function of adding or deleting specific keys to the authorization table. When issuing a number of new keys, it is thus possible for the manufacturer to supply a C-key with the new keys that functions to authorize all the new keys in some or all of the locks in a system. This would simplify the authorization procedure significantly.

It should be noted that there are no links between the GR code of user keys and C-keys. However, it is possible to limit the use of C-keys to specific groups of a lock system.

D-Keys and M-Keys

D-keys (and M-keys) are used like C-keys. For certain operations, a D-key is required. As an example, at the distributor, when locks or keys are to be added to the system, D-software 204 authorized by D-key 202 is used together with downloading of necessary secret information from M-software 304. The M-key is required when using the M-software.

The lock is then programmed at the customer either using the C-key 102 or by means of an adapter interconnecting the programming box 106 and the lock 20.

A preferred embodiment of a key and lock device has been described. It is realized that this can be varied within the scope as defined by the claims. Thus, although a cylinder lock device has been described, the invention is also applicable to other lock types as well, such as card locks.

Although an embodiment has been described, wherein both a public identification item and a secret identification item are stored in the A-list and the public identification item is stored in the NA-list, this could be varied. Thus, for example, it is entirely possible to store just public or just secret identification items in both lists or another combination thereof.

What is claimed is:

1. An electromechanical key and lock device, comprising:

a key having a mechanical code and a key electronic circuitry comprising:

a key memory adapted for storing a public identification item of said key and a group identification item identifying a group of keys having identical mechanical codes, and a key contact; and a stand-alone lock having a lock electronic circuitry comprising:

a lock memory adapted for storing:

a list of authorized keys comprising said public identification item and a secret identification item of authorized keys, and a list of non-authorized keys comprising said public identification item of non-authorized keys, a lock contact arranged to co-operate with said key contact, and a blocking mechanism adapted to block operation of said lock unless an authorized key is inserted in the lock, wherein a key is authorized if said public and secret identification items thereof are present in the list of authorized keys and said public identification item thereof is absent in the list of non-authorized keys.

2. The key and lock device according to claim 1, wherein said key and lock memories are arranged to store an electronic code field comprising said public identification item, said secret identification item and an encryption key.

3. The key and lock device according to claim 1, wherein said public identification item comprises a function identification item identifying one of the following functions: user key, customer authorization key, distributor authorization key, manufacturer authorization key, and lock.

4. The key and lock device according to claim 1, wherein said public identification item comprises a device identification item identifying the different devices of a group and wherein the device identification item is unique in each group.

5. The key and lock device according to claim 1, wherein said secret identification item is identical for all devices within a group.

6. The key and lock device according to claim 1, wherein said public identification item stored in said list of authorized keys or in said list of non-authorized keys comprises device identification item of a specific value denoting an entire group.

7. The key and lock device according to claim 1, wherein secret identification items stored in said key memory can only be read by means of a special authorization key.

8. The key and lock device according to claim 1, wherein a key is added to said list of authorized keys by adding its public and secret identification items to said list of authorized keys.

9. The key and lock device according to claim 1, wherein a key is deleted from said list of authorized keys by deleting its public and secret identification items from said list of authorized keys.

10. The key and lock device according to claim 1, wherein a key is deleted from said list of authorized keys by adding its public identification item to said list of non-authorized keys.

11. The key and lock device according to claim 1, wherein a key is added to the number of authorized keys by deleting its public identification item from said list of non-authorized keys.

12. The key and lock device according to claim 1, wherein a first key of the number of authorized keys is replaced by a second key by checking whether said first key is authorized, adding said public identification item thereof to said list of non-authorized keys and adding said public and secret identification items of said second key to said list of authorized keys.

13. The key and lock device according to claim 1, wherein a master authorization key is recorded in said authorized list of all locks of a master key system.

14. A lock system comprising a plurality of key and lock devices according to claim 1.

15. The lock system according to claim 14, comprising a customer database arranged to keep track of which keys are authorized in which locks in said lock system.

16. The lock system according to claim 14, comprising a distributor database including a key/lock register having an open part for display of open system information for design of changes and a secret part including authorization codes and secret keywords used in the system.

17. The lock system according to claim 14, comprising at least one authorization key used for programming the lock devices, said at least one authorization key being authorized to update said information stored in said lock memory of lock devices.

18. A method of updating authorization information of a lock device of a lock system according to claim 14, wherein the method comprises updating said information in said lock memory of said lock device.

19. The method according to claim 18, wherein the method further comprises:

transferring updating information from a said customer or a distributor database to an authorization key, and transferring updating information from said authorization key to said lock memory of a lock device.

20. The method according to claim 18, wherein the method further comprises:

instructing an updating operation by inserting an authorization key into said lock, and transferring updating information from a user key to said lock memory of said lock device.

21. The method according to claim 18, wherein the method further comprises:

verifying the updating operation by inserting said authorization key into said lock, and transferring verification information from said authorization key to said customer or distributor database.

* * * * *